US007194738B2

(12) United States Patent
Lin et al.

(10) Patent No.: US 7,194,738 B2
(45) Date of Patent: Mar. 20, 2007

(54) METHOD OF CREATING IMAGE FILES AND INSTALLING SOFTWARE BUNDLES ON TARGET COMPUTERS

(75) Inventors: Hsu-Jung Lin, Taipei (TW); Jin-Li Kuo, Taipei (TW)

(73) Assignee: Synnex Technology International Corporation, Taipei (TW)

( * ) Notice: Subject to any disclaimer, the term of this patent is extended or adjusted under 35 U.S.C. 154(b) by 526 days.

(21) Appl. No.: 10/118,005

(22) Filed: Apr. 9, 2002

(65) Prior Publication Data
US 2003/0192043 A1 Oct. 9, 2003

(51) Int. Cl.
*G06F 9/445* (2006.01)
*G06F 9/44* (2006.01)
(52) U.S. Cl. ............... 717/174; 717/175; 717/177
(58) Field of Classification Search ........ 717/168–171, 717/174–178
See application file for complete search history.

(56) References Cited

U.S. PATENT DOCUMENTS

| 6,237,144 | B1 * | 5/2001 | Delo ............................ 717/174 |
| 6,262,726 | B1 * | 7/2001 | Stedman et al. ............. 715/745 |
| 6,453,413 | B1 * | 9/2002 | Chen et al. ..................... 713/2 |
| 6,490,723 | B1 * | 12/2002 | Bearden et al. .............. 717/174 |
| 6,546,553 | B1 * | 4/2003 | Hunt ............................. 717/174 |
| 6,549,914 | B1 * | 4/2003 | Valys ........................... 707/104.1 |
| 6,578,199 | B1 * | 6/2003 | Tsou et al. .................... 717/178 |
| 6,609,135 | B1 * | 8/2003 | Omori et al. ................. 707/104.1 |
| 6,636,958 | B2 * | 10/2003 | Abboud et al. .............. 711/173 |
| 6,681,323 | B1 * | 1/2004 | Fontanesi et al. .............. 713/1 |
| 6,775,829 | B1 * | 8/2004 | Kroening ..................... 717/175 |
| 6,807,665 | B2 * | 10/2004 | Evans et al. .................. 717/175 |
| 6,816,964 | B1 * | 11/2004 | Suzuki et al. .................. 713/2 |
| 6,918,113 | B2 * | 7/2005 | Patel et al. ................... 717/178 |
| 6,922,831 | B1 * | 7/2005 | Kroening et al. ........... 717/172 |
| 6,944,858 | B2 * | 9/2005 | Luu ............................. 717/174 |
| 6,973,647 | B2 * | 12/2005 | Crudele et al. .............. 717/177 |

FOREIGN PATENT DOCUMENTS

CN 1266225 A 9/2000

OTHER PUBLICATIONS

Koan et al, "It takes to village to build an image", ACM SIGUCCS, pp. 200-207, 2003.*

(Continued)

*Primary Examiner*—Anil Khatri
(74) *Attorney, Agent, or Firm*—Lowe, Hauptman & Berner LLP

(57) ABSTRACT

Software bundles are installed on target computers by initially creating a set of distinct image files, each corresponding to a software bundle resident in a reference storage medium of a reference computer built according to specified hardware and software configurations. The image files are copied into each of a plurality of target storage mediums. The target computers are built according to the specified hardware configuration of one of the previously created image files and include the target storage mediums. Each target computer then selects one of the image files in its target storage medium, the selected image file corresponding to the hardware configuration of the target computer and having a desired software configuration. The selected image file for each target computer is decoded to produce the software bundle stored in the target storage medium.

22 Claims, 6 Drawing Sheets

OTHER PUBLICATIONS

Coupaye et al, "Foundations of enteprise software deployment", IEEE SW Maint. & Reng 4th Erup. Conf. pp. 65-73, 2000.*

Dolstra et al, "Imposing a memory management discipline on software deployment", IEEE ICSE, pp. 583-592, 2004.*

Turner et al, "Image Transfer: An end to end design", ACM COMM, pp. 258268, 1992.*

Vo et al, "Compressed inverted files with reduced decoding overheads", ACM SIGIR, pp. 290-297, 1998.*

Pechura, "File archival techniques using data compression", Comm. of the ACM, vol. 25, No. 9, pp. 605-609, 1982.*

Fiala et al, "Data compression with finite windows", Comm. of the ACM, vol. 32, No. 4, pp. 490-505, 1989.*

* cited by examiner

```
FIRST          ┌  WINDOWS ME
STORAGE        │  OFFICE 2000
SPACE          │  XX1 MOTHER BOARD DRIVER
               ┤  XX2 VIDEO CARD DRIVER
               │  XX3 SOUND CARD DRIVER
               │  XX4 MODEM CARD DRIVER
               └

SECOND         ┤  RECOVERY.GHO
STORAGE
SPACE
```

FIG. 7

METHOD OF CREATING IMAGE FILES AND INSTALLING SOFTWARE BUNDLES ON TARGET COMPUTERS

BACKGROUND OF THE INVENTION

1. Field of the Invention

The invention relates to a method for installing a software bundle on a computer, more particularly to one that facilitates installation of software bundles on a plurality of target computers.

2. Description of the Related Art

The installation of software bundles, such as operating systems, hardware driver software and application software, is time-consuming, complicated, and tedious, but is an unavoidable task.

For the end user, when installing software, aside from the need to perform a series of swap-in-swap-out actions for floppy disks or CD-ROMs, the user has to react appropriately to messages shown on the computer. Otherwise, improper computer operation can result which would require re-installation of the software. Furthermore, in the event of software damage caused by damaged storage mediums or virus attacks, the only remedy is to re-install the software, which is troublesome and time-consuming.

For the manufacturer, pre-installation of operating systems, hardware driver software and application software before delivery has become a requirement of most consumers. Since computers are manufactured in batches, typically in units of thousands, it will not be cost-effective to manually install software on each computer. Therefore, computer manufacturers nowadays apply an image file installation technique during the process of installing software bundles on large numbers of computers.

In the conventional method, a reference storage space (or the whole hard disk or other types of storage mediums) having a software bundle resident therein is first coded into an image file. Then, the image file is decoded for storage in the target storage space of each of a plurality of target computers having identical hardware configurations in an assembly line. Since the target storage spaces of the computers have the same contents, the computers are thus installed with the same software bundle.

A drawback of the conventional method resides in that only one image file is used at a time. The conventional method is thus suitable for the mass production of computers with only one set of hardware and software configuration, and cannot be applied when computers with more than one set of hardware and software configuration are to be produced at the same time. Furthermore, the conventional method requires downloading of the image file from a reference storage medium to each target computer for subsequent decoding. The downloading task is time-consuming, and affects the production yield.

SUMMARY OF THE INVENTION

Therefore, the object of the present invention is to provide a method for installing software bundles on target computers that can overcome the aforesaid drawbacks associated with the conventional software installation method.

According to the present invention, a set of distinct image files is created. Each distinct image file corresponds to a software bundle resident in a reference storage medium of a reference computer that was built according to a specified hardware and software configuration. The set of distinct image files is copied into each of a plurality of target storage mediums, and one of the target storage mediums is installed in each of the target computers, each target computer being built according to the specified hardware configuration of one of the created image files. Each target computer selects one of the image files in the target storage medium that is installed therein. The selected image file, which corresponds to the hardware configuration of the target computer and has a desired software configuration, is decoded, thereby producing the software bundle that is stored in the target storage medium which is installed in the target computer.

The method of this invention permits simultaneous installation of software bundles on target computers with different hardware and software configurations in a computer assembly line, and does away with the need to download image files from a reference storage medium. The cost and time for mass-producing computers are thus reduced.

BRIEF DESCRIPTION OF THE DRAWINGS

Other features and advantages of the present invention will become apparent in the following detailed description of the preferred embodiment with reference to the accompanying drawings, of which:

FIG. 7 illustrates the contents of the target storage medium after decoding the selected image file according to the method of the preferred embodiment.

DETAILED DESCRIPTION OF THE PREFERRED EMBODIMENT

Figure 1:
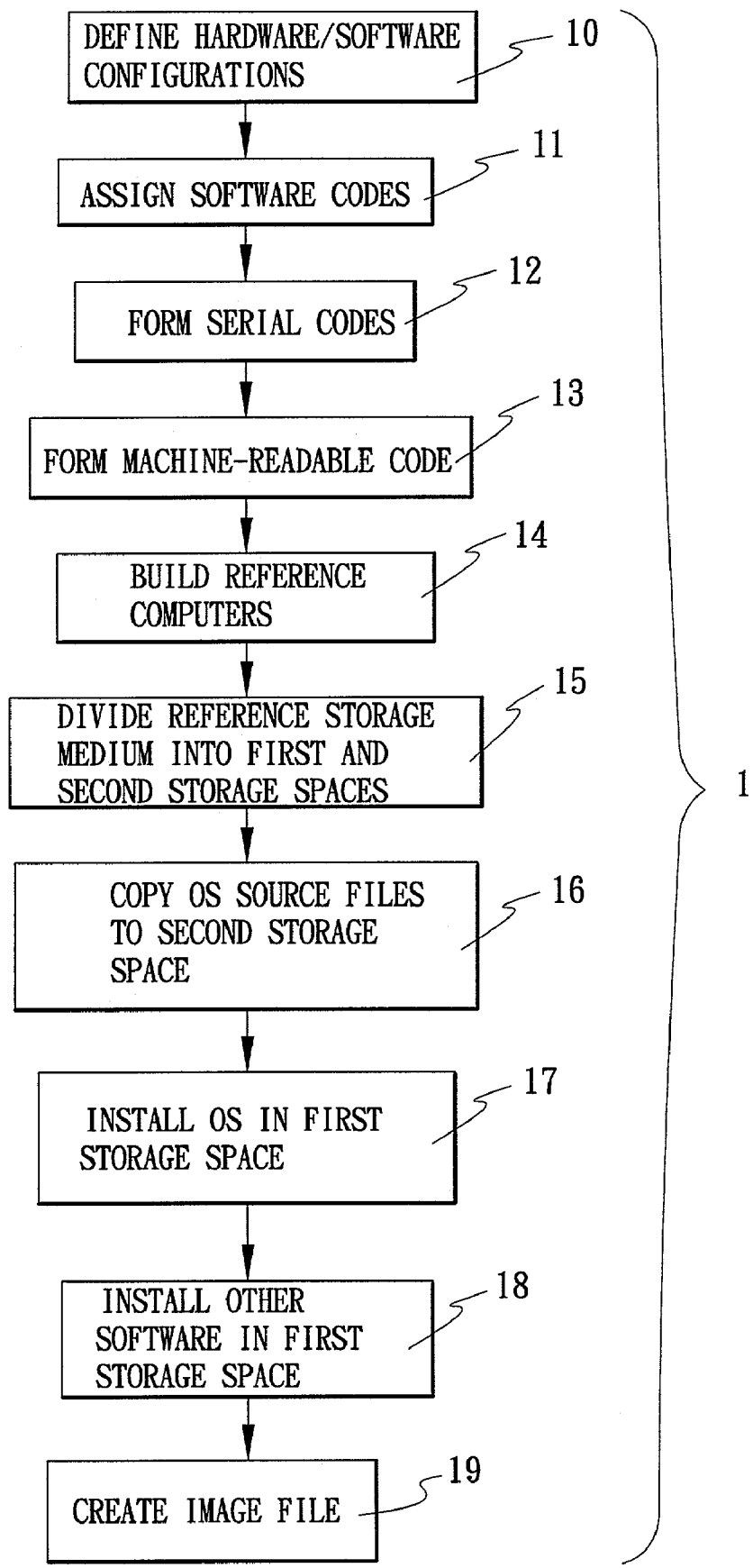
FIG. 1 is a flowchart illustrating an image file creation procedure of the preferred embodiment of a method for installing software bundles on target computers according to the present invention.
Figure 2:
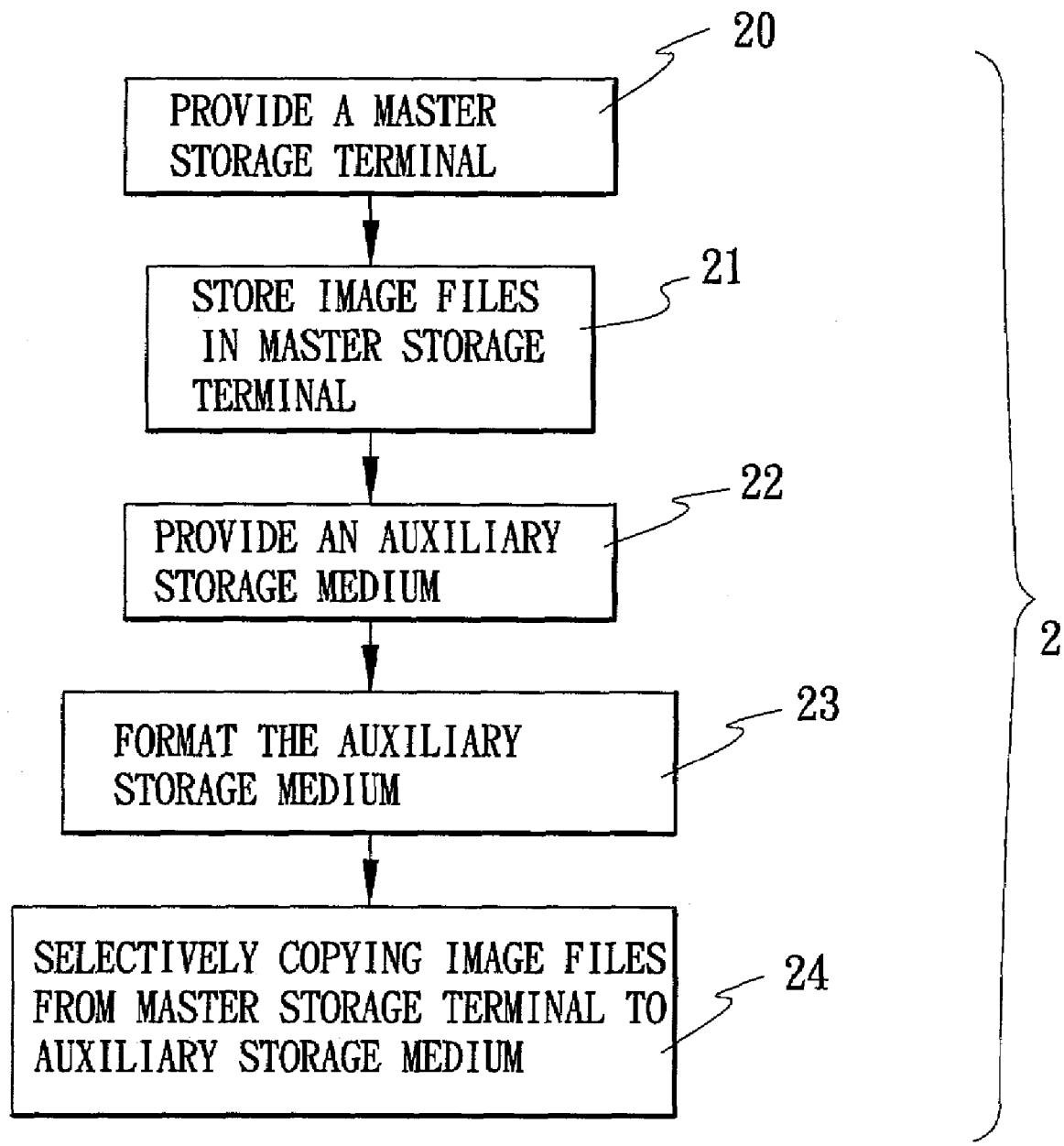
FIG. 2 is a flowchart illustrating an image file management procedure of the method of the preferred embodiment.
Figure 3:
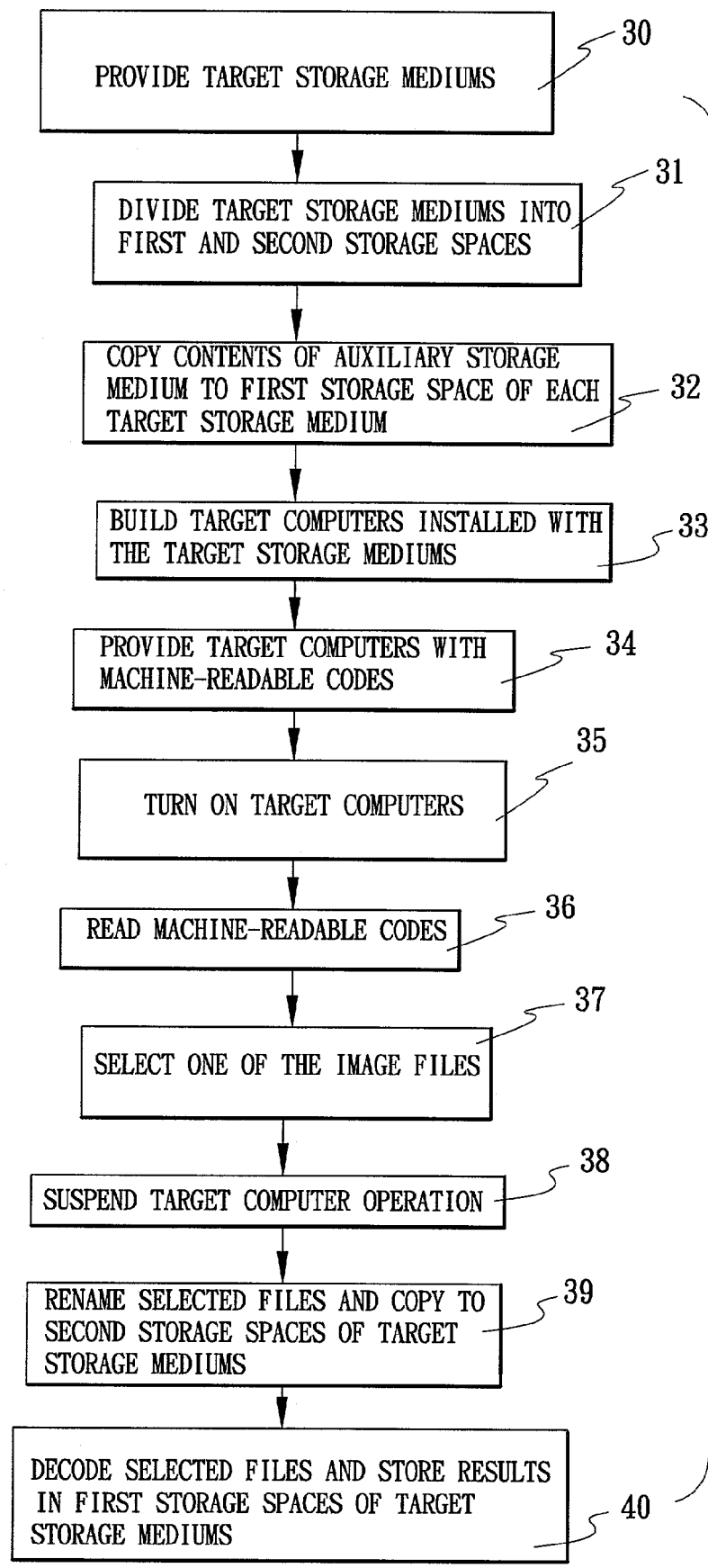
FIG. 3 is a flowchart illustrating an image file decoding procedure of the method of the preferred embodiment.

With reference to FIGS. 1, 2 and 3, the preferred embodiment of a method for installing software bundles according to the present invention generally comprises an image file creation procedure 1, an image file management procedure 2, and an image file decoding procedure 3.

Figure 4:
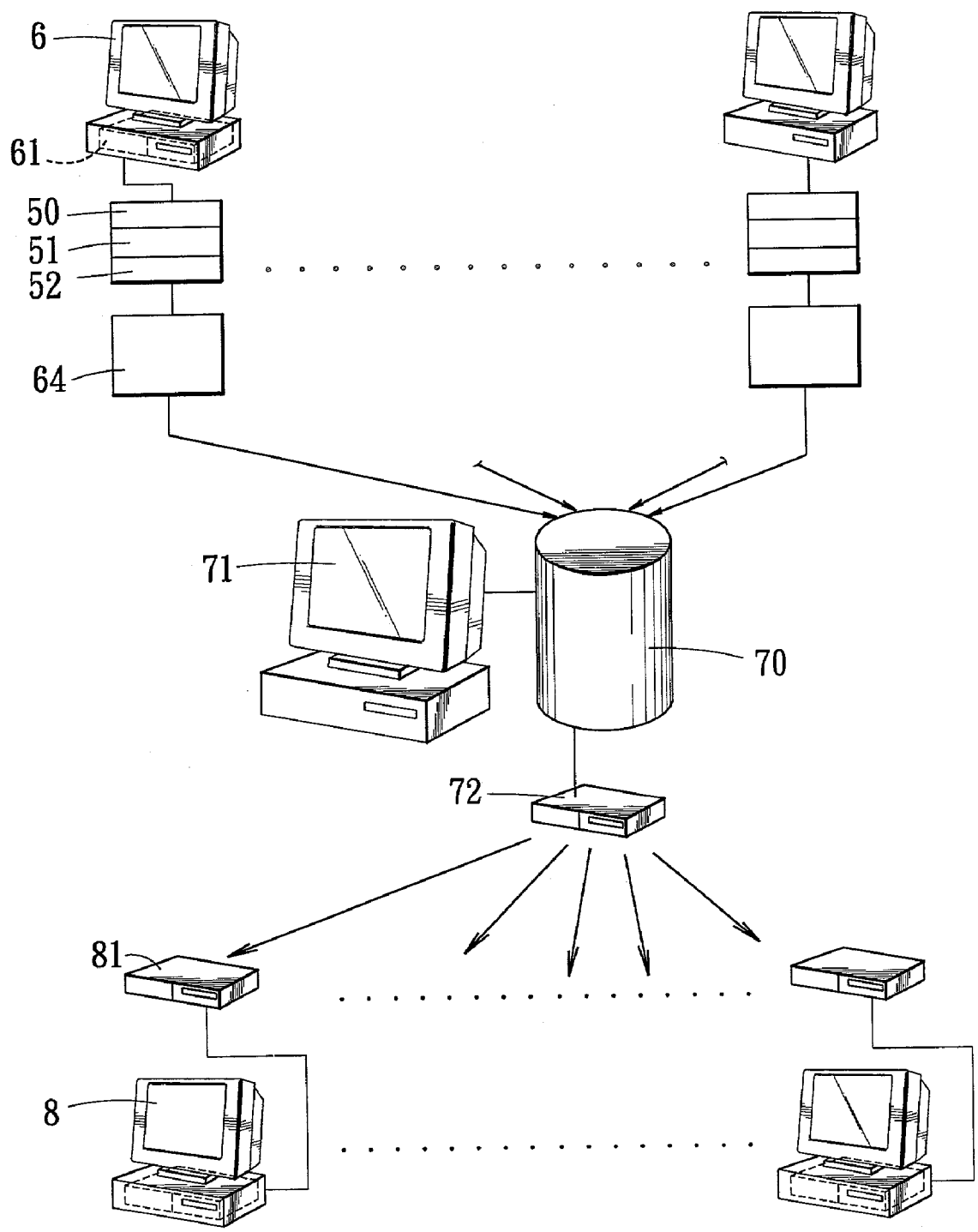
FIG. 4 is a schematic diagram illustrating the physical components for performing the method of the preferred embodiment.

As shown in FIGS. 1 and 4, during the image file creation procedure 1, the computer manufacturer first defines hardware and software configurations of all computers scheduled for production (step 10). A software configuration includes at least one of an operating system 50 (for instance, Windows2000,WindowsXP,etc.), hardware driver software 51 (for instance, motherboards, video cards, etc.) and application software 52 (for instance, Microsoft Office 2000, etc.) that form a specified software bundle.

A code is assigned to every software via a coding rule based on the types of the operating system 50, the hardware driver software 51, and the application software 52 that are available (step 11). In this embodiment, the operating systems provided by the computer manufacturer are different versions of the Windows operating system available from Microsoft. Thus, two alphanumeric characters based on the names of the Windows operating systems can be used for coding, as follows:

| Operating system | Code |
|---|---|
| Windows 98 | 98 |
| Windows ME | ME |
| Windows NT | NT |
| Windows 2000 | 2K |
| Windows XP home version | XH |
| Windows XP professional version | XP |

In this embodiment, the coding rule for the hardware driver software 51 is as follows: For more important hardware components, such as motherboards, video cards, etc., since there are many parts providers and model numbers available, two alphanumeric characters are used for coding. For less important hardware components, such as sound cards, modem cards, network cards, etc., since the computer manufacturer normally has only a limited variety of models by different parts providers on stock, a single alphanumeric character is sufficient for coding. As for the application software 52, such as Microsoft Office 2000, a single alphanumeric character is also sufficient for coding.

The codes assigned to the selected operating system 50, hardware driver software 51 and application software 52 are combined to form a serial code corresponding to a desired software configuration (step 12). The serial code is then formed into a machine-readable code, such as a bar code (step 13). For instance, if a target computer of a specific model provided by the computer manufacturer is equipped with Microsoft Windows ME, a motherboard of model number XX1, a video card of model number XX2, a sound card of model number XX3 and a modem card of model number XX4, of which the assigned codes are ME, 09, 1D, 3 and 1, if the target computer is not equipped with a network card, the assigned code being a default value of 0, and if the target computer is equipped with Microsoft Office 2000 with an assigned code of 6, the complete serial code will be ME091D3106. In practice, the length and content of the serial code can vary according to actual requirements. Furthermore, the order and symbols used in the serial code should not be limited to those of the illustrative embodiment.

Reference computers 6 are then built to have hardware configurations corresponding to the serial codes (step 14). Each reference computer 6 also has a reference storage medium 61, which is a harddisk in this embodiment. For instance, the reference computer 6 built according to the aforesaid serial code ME091D3106 will have a motherboard of model number XX1, a video card of model number XX2, a sound card of model number XX3, a modem card of model number XX4, and no network card.

The reference storage medium 61 of each reference computer 6 is divided into first and second storage spaces (step 15). Source files of the operating system 50 corresponding to the serial code are copied to the second storage space of the reference storage medium (step 16). For instance, the source files of Microsoft Windows ME will be copied to the second storage space of the reference storage medium 61 of the reference computer 6 that corresponds to the aforesaid serial code ME091D3106.

Thereafter, the source files of the operating system 50 in the second storage space are used to install the operating system 50 in the first storage space (step 17). Then, all hardware driver software 51 and application software 52 corresponding to the serial code are installed in the first storage space (step 18). The software bundle corresponding to the serial code is stored in the first storage space at this time. Therefore, the software bundle stored in the first storage space for the aforesaid serial code ME091D3106 will be the Windows ME operating system, the Microsoft Office 2000 application software, and the hardware driver software for a motherboard of model number XX1, a video card of model number XX2, a sound card of model number XX3, and a modem card of model number XX4.

Finally, the contents of the first storage space of the reference storage medium 61 of each reference computer 6 are coded and compressed to form a corresponding image file 64 using a commercially available image file coding program. In this embodiment, the software GHOST available from SYMMANTEC is used for coding and decoding the image file 64, and the image file compression option in the software GHOST is selected to reduce the file size upon coding. It is noted that other software packages are available for image file coding and decoding. One such software package is DriveImage available from PowerQuest. A set of distinct image files 64 corresponding to the specified hardware and software configurations is created at this time.

As shown in FIGS. 2 and 4, during the image file management procedure 2, a master storage terminal 70 with a large storage capacity is provided (step 20). In this embodiment, each of the image files 64 has a filename identical to the corresponding serial code, and is stored in the master storage terminal 70 (step 21). Furthermore, a magnetic tape of a server computer 71 is used as the master storage terminal 70 in this embodiment. In practice, any storage medium with a sufficient expandable capacity to store all of the image files 64 can be used. For instance, assuming that the computer manufacturer can provide a hundred model numbers of computers with various combinations of operating systems 50, hardware driver software 51 and application software 52 for delivery, a hundred corresponding image files 64 with the same file extensions 'gho' must be stored in the master storage terminal 70. In practice, the filenames of the image files 64 need not necessarily be identical to the serial codes as taught in this embodiment. What is required is that there should be a one-to-one correspondence between each image file 64 and each serial code. Furthermore, the image files 64 can be maintained by a database management system in the server computer 71 for database management operations, such as adding, deleting, modifying and updating to meet customer requirements, sales results, inventory management, etc.

An auxiliary storage medium 72 with a storage capacity smaller than that of the master storage terminal 70 and having an access speed faster than that of the master storage terminal 70 is then provided (step 22). In this embodiment, a 40 GB hard disk is used as the auxiliary storage medium 72. The auxiliary storage medium 72 is formatted as a bootable storage medium (step 23) which contains a batch file of bootstrap execution (in this embodiment, AUTOEXEC.BAT), a file-selection execution file (named PICKFILE.EXE in this embodiment), and an image-file-decoding execution file (in this embodiment, GHOST.EXE).

The steps associated with the file-selection execution file are as follows:

1. Reading the machine-readable code, such as with the use of a bar code reader, to determine the corresponding serial code, and selecting an image file 64 corresponding to the serial code and resident in a first storage space of the same storage medium. For instance, when the aforesaid ME091D3109 serial code is detected, the image file ME091D3109.GHO will be selected. Because the serial code is in a machine-readable form, the need for manual input is obviated to minimize the possibility of human error; and 2. Renaming the selected image file 64, and copying the same to a second storage space of the same storage medium. In this embodiment, the selected image file is renamed as "RECOVERY.GHO". In practice, any valid filename accepted by the image file coding and decoding program may be used.

The operations associated with the image-file-decoding execution file include decoding and decompressing the selected image file in the aforesaid second storage space to obtain the desired software bundle that overwrites the image files initially present in the first storage space of the same storage medium.

In this embodiment, the contents of the batch file of bootstrap execution (AUTOEXEC.BAT) include at least the following statements:

PICKFILE.EXE

Ghost -clone=pload,src=d:recovery.gho dst=1:1,-sure -rb

Even though the master storage terminal 70 stores all (such as the aforesaid hundred) image files 64 corresponding to all model numbers of computers having desired combinations of operating system 50, hardware driver software 51 and application software 52, only a small portion (such as twenty) of model numbers of computers are usually assembled during one production cycle. Therefore, by selectively copying the image files 64 stored in the master storage terminal 70 to the auxiliary storage medium 72 (step 24), the time and space required during the subsequent copying operation can be reduced. The image file management procedure 2 is completed at this time.

Figure 5:
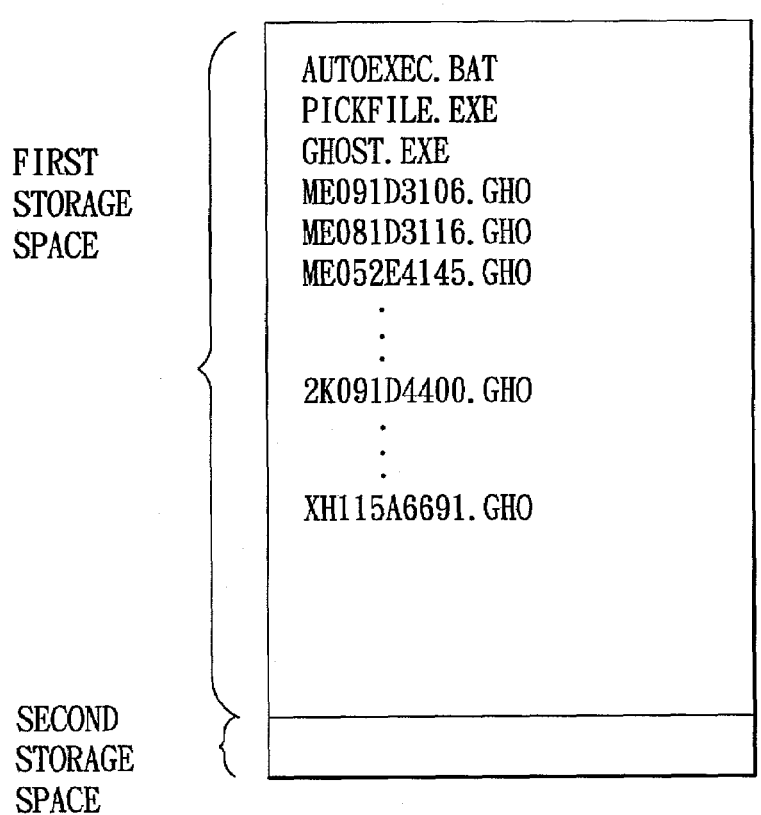
FIG. 5 illustrates the contents of a target storage medium after image files have been copied thereto according to the method of the preferred embodiment.

As shown in FIGS. 3 and 5, during the image file decoding procedure 3, a plurality of target storage mediums 81 are first provided (step 30). Each target storage medium 81 should have a storage capacity not less than that of the auxiliary storage medium 72. In this embodiment, each target storage medium 81 is a 40 GB hard disk, and is identical to the auxiliary storage medium 72 in construction.

Each target storage medium 81 is divided into a first storage space that is formatted as a bootable storage space with a storage capacity sufficient to contain all of the files in the auxiliary storage medium 72 (in this embodiment, 39 GB is allocated for the first storage space), and a second storage space with a storage capacity larger than any of the image files in the auxiliary storage medium 72 (in this embodiment, 1 GB is allocated for the second storage space with the assumption that no image file is larger than 1 GB) (step 31).

Thereafter, with the use of commercially available high-speed hard disk copying apparatuses, the contents of the auxiliary storage medium 72 are copied to the first storage space of each of the target storage mediums 81 (step 32). The number of the target storage mediums 81 to be prepared corresponds to the number of target computers 8 to be produced. For instance, if the number of the target computers 8 is one thousand, then the contents of the auxiliary storage medium 72 must be copied to one thousand of the target storage mediums 72. FIG. 5 illustrates the contents of a target storage medium 81 after the contents of the auxiliary storage medium 72 have been copied thereto.

Each of the target computers 8 is built according to the hardware configuration associated with one of the serial codes, and is installed with one of the target storage mediums 81 (step 33). In this embodiment, a machine-readable code in the form of a bar code that contains the corresponding serial code is attached to a suitable location of the housing of each target computer 8 (step 34). For instance, with reference to the forming of the machine-readable codes described beforehand, if the specified hardware and software configuration of a target computer 8 is Microsoft Windows ME, a motherboard of model number XX1, a video card of model number XX2, a sound card of model number XX3, a modem card of model number XX4, and Microsoft Office 2000, the bar code attached to the housing of the target computer 8 should contain the aforesaid ME091D3106 serial code.

Each of the target computers 8 is turned on thereafter (step 35). At this time, the batch file of bootstrap execution (AUTOEXEC.BAT) will be processed by each of the target computers 8. Due to the first statement of the batch file, each of the target computers 8 will operate according to the file-selection execution file (PICKFILE.EXE) for reading the respective machine-readable code (step 36).

In this embodiment, because the machine-readable code is in the form of a bar code that is attached to the housing of the target computer 8, reading of the bar code can be accomplished via a bar code reader held by an operator or disposed at a fixed location on the assembly line.

Figure 6:
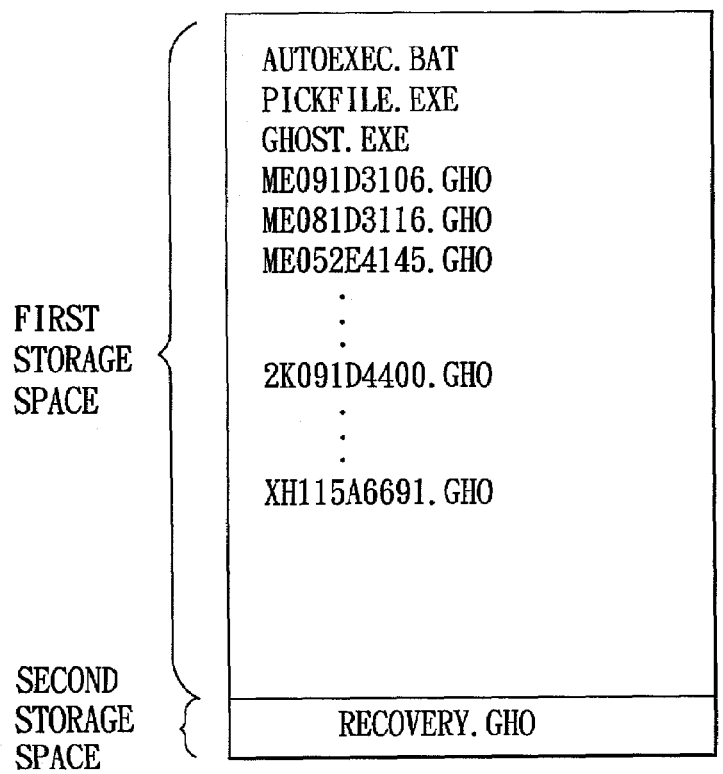
FIG. 6 illustrates the contents of the target storage medium after selection of one of the image files according to the method of the preferred embodiment.

One of the image files 64 in the first storage space of the target storage medium 81 and corresponding to the bar code that was read by the bar code reader is then selected (step 37). After suspending operation of the target computers 8 for a predetermined time period to ensure system stability (step 38), the selected image file 64 for each of the target computers 8 will be renamed as "RECOVERY.GHO" in this embodiment, and will be copied to the second storage space of the respective target storage medium 81 (step 39), as best shown in FIG. 6.

Finally, each of the target computers 8 will operate according to the image-file-decoding execution file (GHOST.EXE) to decode and decompress the selected image file stored in the second storage space so as to obtain the desired software bundle that overwrites the image files initially present in the first storage space of the respective target storage medium 81 (step 40).

In this embodiment, as shown in FIG. 7, if the selected image file is ME091D3106.GHO, after decoding the same, the first storage space of the target storage medium 81 will have Microsoft Windows ME, hardware driver software of a motherboard of model number XX1, a video card of model number XX2, a sound card of model number XX3 and a modem card of model number XX4, and Microsoft Office 2000 installed therein. The selected image file remains in the second storage space of the target storage medium 81. Thus, the computer manufacturer can sell the target computer 8 together with a recovery storage medium that contains an image-decoding file. When the first storage space of the target storage medium 81 is corrupted, the computer user can use the image decoding file in the recovery storage medium to decode the image file "RECOVERY.GHO" in the second storage space, thereby resulting in the software bundle that overwrites the corrupted files in the first storage space.

It should be noted that the machine-readable code provided on each target computer 8 is not limited to one that is in bar code form. In other embodiments, the machine-readable code can reside in the Basic Input/Output System (BIOS) of the target computers 8 and can be applied in the selection of the image files 64 in the target storage medium 81.

The following are some of the advantages of the method of this invention:

1. This invention permits the simultaneous manufacture of computers having different hardware and software configurations in a single assembly line.

2. Because human involvement is reduced to a minimum, the possibility of human error is minimized as well.

3. Because a set of possible image files is copied to target storage mediums, instead of installing software bundles piece-by-piece or downloading image files via reference computers for software bundle installation, production time and costs can be reduced.

4. The possibility of database management of image files does not only improve the production flow, but also provides extra benefits in terms of inventory control and marketing analysis.

5. The possibility of restoring a corrupted storage medium to its original state at little cost is an attractive feature that appeals to consumers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method of installing software bundles on target computers, comprising the steps of:
   (a) creating a set of distinct image files, each of which corresponds to a software bundle resident in a reference storage medium of a reference computer that was built according to a specified hardware and software configuration;
   (b) copying the set of distinct image files into each of a plurality of target storage mediums;
   (c) installing one of the target storage mediums in each of a plurality of target computers, each built according t& the specified hardware configuration of one of the image files created in step (a);
   (d) causing each of the target computers to select one of the image files in the target storage medium that is installed therein, the selected one of the image files corresponding to the hardware configuration of the target computer and having a desired software configuration;
   (e) for each of the target computers, decoding the selected one of the image files stored in the medium of the particular target computer to produce the software bundle that is stored in the target storage medium which is installed in the target computer,
   (f) loading the selected image files into a second space of the target storage mediums in compressed form;
   (g) decoding and decompressing the compressed image files in the second spaces of the target storage mediums; and loading the decoded and decompressed image files into a first space of the target storage mediums so any image files in the first space are overwritten by the decoded and decompressed image files; the target computer using the decoded and decompressed image file in the first space in normal operation.

2. The method of claim 1, wherein said step (a) includes:
building a plurality of the reference computers such that each of the reference computers has the specified hardware configuration;
storing software flies in the reference storage medium of each of the reference computers to produce the software bundle and to configure each of the reference computers with the specified software configuration; and
creating the image files that correspond respectively to the software bundles in the reference storage mediums of the reference computers.

3. The method of claim 1, wherein said step (b) includes: storing the image files in a master storage terminal.

4. The method of claim 3, wherein said step (b) further includes:
storing a subset of the image files in the master storage terminal in an auxiliary storage medium, the auxiliary storage medium having a storage capacity smaller than that of the master storage terminal and further having an access speed faster than that of the master storage terminal.

5. The method of claim 4, wherein said step (b) further includes:
copying the contents of the auxiliary storage medium into each of the target storage mediums.

6. The method of claim 5, wherein the auxiliary storage medium and the target storage mediums are identical in construction.

7. The method of claim 1, wherein in said step (c), each of the target computers includes a serial code corresponding to the selected one of the image files.

8. The method of claim 7, wherein the serial code is a machine-readable code.

9. The method of claim 8, wherein the machine-readable code is a bar code.

10. The method of claim 8, wherein the machine-readable code resides in BIOS of the target computer.

11. The method of claim 8, wherein in said step (d), selection of one of the image flies is carried out by reading the machine-readable code.

12. The method of claim 11, wherein the selected one of the image files has a file name corresponding to the machine-readable code of the target computer.

13. The method of claim 12, wherein the machine-readable code includes at least one of a first code portion corresponding to a desired operating system, a second code portion corresponding to a desired hardware driver software, and a third code portion corresponding to a desired application software.

14. The method of claim 1, wherein in said step (b), each of the target storage mediums has a first storage space for storing the image files therein, and a second storage space smaller than the first storage space.

15. The method of claim 14, wherein said step (e) includes:
copying the selected one of the image files into the second storage space of the target storage medium; and
decoding the selected one of the image flies to produce the software bundle that overwrites the image files in the first storage space of the target storage medium.

16. The method of claim 1, wherein the software bundle includes at least one of an operating system, hardware driver software, and application software.

17. The method of claim 1 wherein the copying step (b) is performed while the target storage mediums are not installed in the target computers and the installing step (c) occurs after the copying step (b) has been performed.

18. The method of claim 1 wherein the following steps are performed on the target storage mediums after they have been installed during step (c): copying operating system source files corresponding to serial codes for the operating system of a particular target computer to the second storage space of the reference storage medium of the particular target computer; installing the operating system in the first storage space by using the source files stored in the second storage space of the particular target computer; installing software for the hardware driver and application software in the first storage space so a software bundle corresponding to the serial code is stored in the first storage space of the particular target computer; and creating an image code by coding and compressing the contents of the first storage space of the particular target computer.

19. A method of installing software bundles on target computers, comprising the steps of:
   (a) creating a set of distinct image files, each of which corresponds to a software bundle resident in a reference storage medium of a reference computer that was built according to a specified hardware and software configuration;
   (b) copying the set of distinct image files into each of a plurality of target storage mediums;
   (c) installing one of the target storage mediums in each of a plurality of target computers, each built according to the specified hardware configuration of one of the image files created in step (a);
   (d) causing each of the target computers to select one of the image files in the target storage medium that is installed therein, the selected one of the image files corresponding to the hardware configuration of the target computer and having a desired software configuration;
   (e) for each of the target computers, decoding the selected one of the image files stored in the medium of the particular target computer to produce the software bundle that is stored in the target storage medium which is installed in the target computer,
   (f) loading the selected image files into a second space of storage arrangements in compressed form;
   (g) decoding and decompressing the compressed image files in the second spaces; and loading the decoded and decompressed image files into a first space of the target storage mediums so any image files in the first space are overwritten by the decoded and decompressed image files; the target computer using the decoded and decompressed image file in the first space in normal operation.

20. The method of claim 19, wherein said step (a) includes:
   building a plurality of the reference computers such that each of the reference computers has the specified hardware configuration;
   storing software tiles in the reference storage medium of each of the reference computers to produce the software bundle and to configure each of the reference computers with the specified software configuration; and
   creating the image files that correspond respectively to the software bundles in the reference storage mediums of the reference computers.

21. The method of claim 19, wherein said step (b) includes: storing the image files in a master storage terminal.

22. The method of claim 19 wherein the copying step (b) is performed while the target storage mediums are not installed in the target computers and the installing step (c) occurs after the copying step (b) has been performed.

* * * * *